United States Patent
Weber et al.

(10) Patent No.: US 6,953,325 B2
(45) Date of Patent: Oct. 11, 2005

(54) SAFETY DEVICE TO LIMIT PRESSURE IN AN AXIAL-PISTON COMPRESSOR HOUSING

(75) Inventors: Georg Weber, Offenbach (DE); Michael Sickelmann, Stuttgart (DE); Tilo Schäfer, Danbach (DE); Christoph Walter, Stuttgart (DE); Hans-Joachim Krauss, Stuttgart (DE); Harald Raiser, Balingen (DE); Frank Obrist, Dornbirn (AT)

(73) Assignees: LuK Fahrzeug-Hydraulik GmbH & Co., KG, Bad Homburg (DE); Behr GmbH & Co., Stuttgart (DE)

(*) Notice: Subject to any disclaimer, the term of this patent is extended or adjusted under 35 U.S.C. 154(b) by 219 days.

(21) Appl. No.: 10/337,242

(22) Filed: Jan. 6, 2003

(65) Prior Publication Data

US 2003/0223883 A1 Dec. 4, 2003

Related U.S. Application Data

(63) Continuation of application No. PCT/DE01/02388, filed on Jun. 27, 2001.

(30) Foreign Application Priority Data

Jul. 6, 2000 (DE) .......................................... 100 32 905

(51) Int. Cl.$^7$ ................................................. F04B 1/26
(52) U.S. Cl. ................. 417/222.2; 417/213; 137/513.7; 137/543.23
(58) Field of Search .............................. 417/222.2, 213; 137/513.7, 543.23

(56) References Cited

U.S. PATENT DOCUMENTS

| 3,701,361 | A | * | 10/1972 | Bunn et al. | ............ | 137/543.23 |
|---|---|---|---|---|---|---|
| 5,332,365 | A | | 7/1994 | Taguchi | | |
| 5,588,807 | A | | 12/1996 | Kimura et al. | | |
| 6,217,291 | B1 | * | 4/2001 | Ota et al. | ................. | 417/222.2 |
| 6,234,763 | B1 | * | 5/2001 | Ota et al. | ................. | 417/222.2 |
| 6,354,810 | B1 | * | 3/2002 | Minami et al. | ........... | 417/222.2 |
| 6,361,283 | B1 | * | 3/2002 | Ota et al. | ................. | 417/222.2 |
| 6,364,627 | B1 | * | 4/2002 | Herder et al. | ............. | 417/222.2 |
| 6,514,049 | B2 | * | 2/2003 | Mera et al. | ............... | 417/222.2 |

FOREIGN PATENT DOCUMENTS

| EP | 0 953 765 A2 | 4/1999 |
|---|---|---|
| EP | 0 992 746 A2 | 10/1999 |
| EP | 0 992 747 A2 | 10/1999 |
| EP | 1 004 834 A2 | 11/1999 |
| EP | 1 014 016 A2 | 12/1999 |

* cited by examiner

Primary Examiner—Cheryl Tyler
Assistant Examiner—Emmanuel Sayoc
(74) Attorney, Agent, or Firm—Darby & Darby

(57) ABSTRACT

A safety device limits the pressure in an axial-piston compressor with variable piston displacement. The compressor has as wobble plate or swash plate whose tilt angle can be variably controlled by the pressure differential between the high pressure in the discharge pressure zone and the pressure in the piston-drive chamber. The safety device consists of a valve arranged in a connector channel between the discharge pressure zone and the pressure zone of the piston-drive chamber. When the discharge pressure exceeds a given pressure limit, the safety device responds by allowing an increased flow of pressure medium from the discharge pressure zone to the piston-drive chamber. The influx of pressure medium into the piston-drive chamber causes a reduction of the tilt angle of the swash plate or wobble plate.

12 Claims, 1 Drawing Sheet

SAFETY DEVICE TO LIMIT PRESSURE IN AN AXIAL-PISTON COMPRESSOR HOUSING

This is a continuation of international application Ser. No. PCT/DE01/02388, filed Jun. 27, 2001, the entire disclosure of which is hereby incorporated by reference.

BACKGROUND OF THE INVENTION

The invention relates to a safety device for limiting the high pressure in the discharge pressure zone of an air-conditioning compressor with a variable piston stroke or displacement volume. The compressor is of the type known as wobble plate piston pump or swash plate piston pump, wherein the angle of the wobble plate or swash plate can be variably controlled by the pressure differential between the high pressure in the discharge pressure zone and the pressure in the piston-drive chamber, or in some cases by the pressure differential between the piston-drive chamber and the suction pressure zone of the air-conditioning compressor. Compressors of this type therefore have a connector channel that connects the outlet chamber in the discharge pressure zone to the pressure zone of the piston-drive chamber. The connector channel can contain a valve or a by-pass throttle which can have a controlling influence on the pressure differential between the discharge pressure zone and the pressure zone of the piston-drive chamber. In addition, there can be a connection between the pressure zone of the piston-drive chamber and the suction pressure zone containing in some cases a further valve or fixed throttle by which the pressure differential between the piston-drive chamber and the suction chamber can be influenced. A typical variable-displacement compressor of the kind that is used, e.g., in air conditioners for motor vehicles has a piston-drive chamber arranged inside a housing and containing the driving elements for pumping the refrigerant medium. A driving shaft is rotatably supported in bearing elements. A portion of the housing contains a cylinder barrel containing a plurality of cylinder bores. Each cylinder bore contains a movable piston. An inclined swash plate or wobble plate (hereinafter also collectively referred to as a tilted plate) is mounted on the driving shaft and arranged so that its tilt angle can be changed while it rotates with the driving shaft. The pistons are constrained by appropriate mechanical elements to follow the movement of the wobble-plate surface. The lengths of the piston strokes in the cylinder bores are determined by the tilt angle of the wobble plate or swash plate.

The angle of the tilted plate is controlled by adjusting the pressure in the piston-drive chamber in relation to the amounts of pressure acting on the pistons in the discharge pressure zone (high pressure zone) and in the suction zone (low pressure zone). In other words, the difference between the amounts of pressure acting on the respective ends of the pistons can be adjusted by changing the pressure in the piston-drive chamber. The adjustment changes the angle of the tilted plate, whereby the displacement volume of the compressor is changed. Furthermore, throttle devices or valve devices are arranged between the different pressure zones, whereby the pressure in the piston drive chamber can be regulated in relation to the discharge pressure and the suction pressure. In some cases, the valve devices are remote-controlled through electromagnetic devices. In addition, compressors of the known state of the art have safety devices to limit the maximum pressure in the discharge zone (high-pressure zone). If the maximum allowable pressure in the discharge zone (i.e., the high-pressure zone) is exceeded, the safety device will release refrigerant to the ambient environment, for example through a burst disc or a pressure-limiting valve. In particular with burst discs, continued operation of the compressor is impossible because the burst disc is destroyed by the excess pressure. With pressure-limiting valves, there is in any case a loss of refrigerant because a part of the refrigerant in the air-conditioning system is released to the ambient environment.

OBJECT OF THE INVENTION

In view of the drawbacks inherent in safety devices for air-conditioning compressors of the prior art, the invention has the objective of providing an improved safety device to protect the air-conditioning compressor against overpressure in the high-pressure zone.

Specifically, the invention aims to provide a safety device which, after responding to an overpressure situation, allows a continued operation of the compressor and does not cause a loss of refrigerant medium.

SUMMARY OF THE INVENTION

The invention meets the foregoing objective by providing a safety device to limit the pressure in a compressor with a variable piston stroke or variable displacement volume. The compressor has a wobble plate or swash plate, whose tilt angle can be variably controlled by the pressure differential between the high pressure in the discharge pressure zone and the pressure in the piston-drive chamber, or in some cases by the pressure differential between the piston-drive chamber and the suction zone. There is a connector channel that connects the discharge pressure zone to the pressure zone of the piston-drive chamber. The connector channel contains a valve, and in some cases there can also be a by-pass throttle arranged between the discharge pressure zone and the piston-drive chamber. When the discharge pressure exceeds a given maximum limit, the valve device opens the connection from the discharge pressure zone to the pressure zone of the piston-drive chamber, or the valve device may in some cases be designed to increase the aperture of the passage opening and thereby increase the flow of pressurized medium from the discharge pressure zone to the piston-drive pressure zone.

With the increased flow of pressurized medium from the high-pressure zone to the piston-drive pressure zone, the corresponding pressure rise in the piston-drive chamber pressure causes a decrease in the stroke height of the tilted plate so that the throughput power of the compressor is reduced by the action of the pressure-limiting device. The safety device is configured as a valve device, in particular a pressure-limiting valve. In accordance with the invention, the valve device has a movable valve body that is pushed in the opening direction of the valve passage by the high pressure in the discharge pressure zone against the opposing force of a spring, among other forces that may act on the movable valve body.

Preferably, the effective pressure-bearing surface in the spring compartment of the valve body is exposed to the ambient pressure, normally of the surrounding atmosphere. An embodiment of the inventive valve device includes the following components, among others: a cover plate 1, a bellows 2, a spring 3, a housing part 4, a valve housing 5, a movable valve body in the form of a piston 6, and as an optional feature three O-ring seals 7, 8, 9, or a sealing arrangement that has a comparable effect.

In a further embodiment, the presettable maximum pressure for the pressure limit can be additionally changed by an external element such as, e.g., an electromagnetic device, an electrical actuator motor device, a temperature dependent actuating element, or pressure-medium driven actuator cylinders.

Also, in a further embodiment, an additional throttle device or an additional valve can be arranged in the additional connection from the pressure zone of the piston-drive chamber to the suction pressure zone.

The invention has the particular advantages that the compressor can continue to operate after a response action of the pressure-limiting device and that no refrigerant medium is released to the ambient environment.

A further embodiment is distinguished by the feature that the presettable maximum pressure is determined substantially by comparing the pressure in the high-pressure zone to the spring force and the ambient pressure. The pressure in the piston-drive chamber may also come into play, albeit to an insignificant extent.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The detailed description of preferred embodiments which follows below is based on the attached drawing, FIG. 1, representing an embodiment of the safety device according to the invention.

DETAILED DESCRIPTION OF PREFERRED EMBODIMENTS

Figure 1:
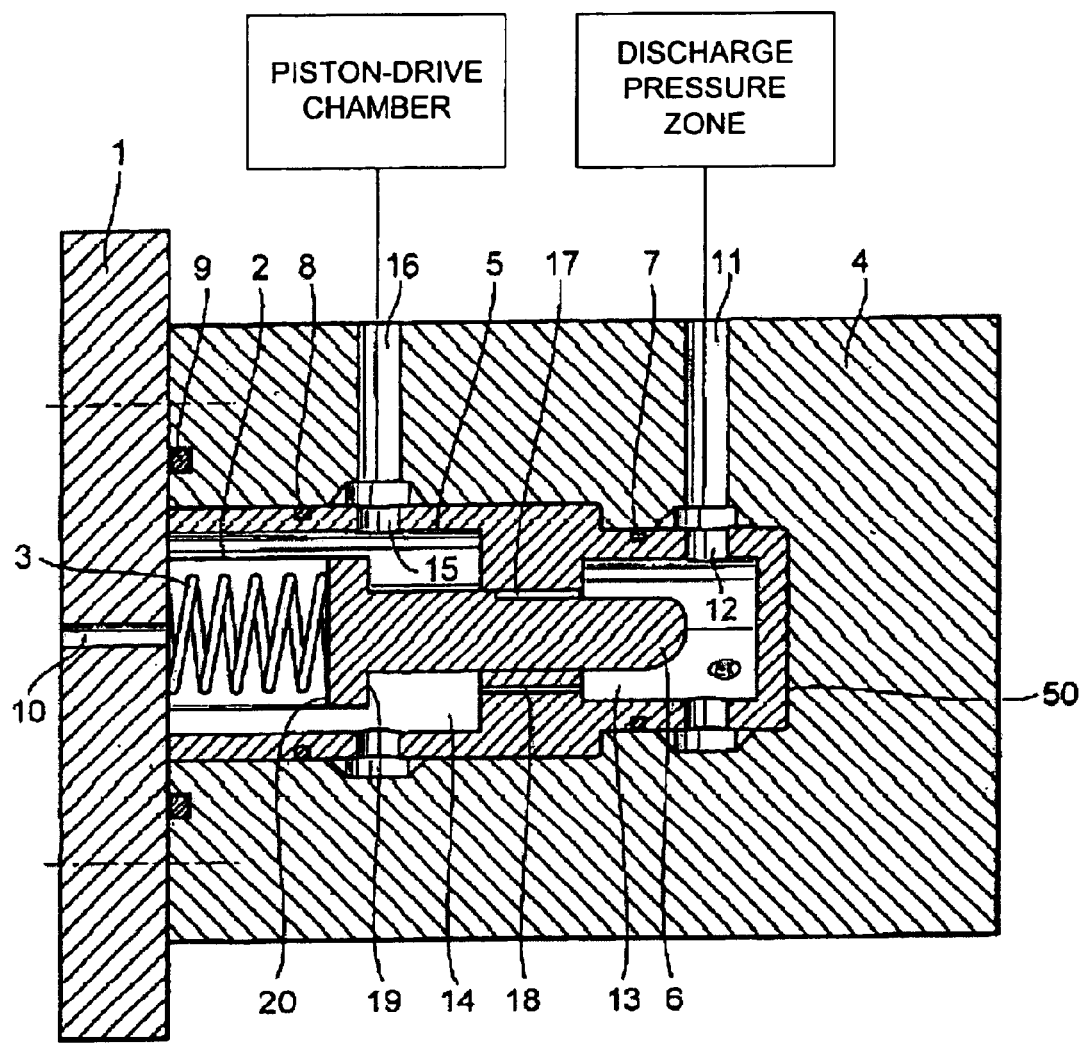

In the embodiment of a safety device shown in FIG. 1, a valve housing 5 is installed in a housing portion 4 which can be formed by a part of a compressor housing. The valve housing 5 contains a movable valve piston 6 that is pushed into the closed valve position by a spring 3. The spring compartment of the spring 3 is sealed off from the rest of the valve compartment by a bellows 2 that is arranged between the valve piston 6 and a cover plate 1. The spring compartment of the spring 3 shares the ambient pressure outside the air-conditioning compressor through an opening 10 in the cover plate 1. The valve housing 5 is sealed against the housing portion 4 by O-ring seals 7 and 8. As is self-evident, other sealing arrangements could be used to accomplish the same effect. The cover plate 1 is likewise sealed against the housing portion 4 by a seal 9. A connection, shown in FIG. 1 as a channel bore through the housing portion 4, runs from the discharge pressure zone 11 of the compressor, i.e., from the high-pressure zone, and leads through one or more bore holes 12 in the valve housing 5 into a pressure compartment 13 where the high pressure acts against the right-hand side, i.e., the rounded end of the valve piston 6 shown in the drawing, and thus exerts on the projected pressure-bearing surface a force that works against the spring force. In the illustrated arrangement, the valve piston 6 seals the high-pressure compartment 13 against a second pressure compartment 14. Through one or more bore holes 15 in the valve housing 5, the pressure compartment 14 is connected to a channel that leads to the pressure zone 16 of the piston-drive chamber. The valve piston 6 can in addition have a throttle-groove channel 17 that opens up as a throttle passage from the compartment 13 to the compartment 14 when the valve piston 6 moves towards the open position against the spring force of the spring 3 and against the force that the atmospheric pressure exerts on the surface 20 in the spring compartment. Depending on the design of the throttle-groove channel 17, pressurized medium can flow from compartment 13 to compartment 14 either at a constant rate or at a variable rate that increases with the amount of piston displacement. In addition, a fixed bypass throttle 18 can be arranged in parallel with the valve piston 6 between the compartments 13 and 14 to constantly allow a certain amount of pressurized medium to flow from compartment 13 to compartment 14 and thus from the high-pressure zone 11 of the compressor to the piston-drive zone 16 of the compressor.

The safety device functions as follows: The pressure in the discharge pressure zone 11 of the compressor is communicated to the pressure compartment 13 and exerts a force against the right-hand side of the piston 6 that is counteracted by—and thereby compared to—the forces acting on the left-hand side of the piston 6, i.e., the forces of the spring 3, the bellows 2, and the pressure force caused by the ambient pressure pushing against the surface 20 inside the spring compartment. The pressure communicated from the piston-drive compartment to the compartment 14 and acting on the ring-shaped step surface 19 of the piston can be disregarded if the step surface 19 is kept small enough, or if there is no step, so that the valve piston 6 has a uniform diameter over its entire length. In this arrangement, the given spring force and the atmospheric pressure acting on the surface 20 represent the reference for the pressure force, defining the limit for the maximum allowable pressure on the right-hand side of the piston 6. As the high pressure in the compressor is compared directly to the combined forces of the atmospheric pressure and the spring, the limitation on the maximum pressure is independent of the other pressure levels in the compressor such as the suction pressure. This means that the pressure limit is independent of those pressure levels which in known kinds of compressors have an effect on the valve devices of the known prior art. When the maximum allowable pressure is exceeded and the piston 6 is thereby moved towards the left (in reference to FIG. 1) so that pressurized medium flows from the high-pressure compartment 13 to the compartment 14, this has the immediate effect of stopping the further pressure rise in the high-pressure zone 11. In addition, the influx of pressurized medium into the piston-drive pressure zone causes a pressure rise in the piston-drive compartment which puts the compressor into a condition in which the tilt angle of the tilted plate is reduced or minimized, whereby the length of the piston stroke is decreased. As a consequence, the flow of pressurized medium generated by the compressor is reduced and can no longer contribute to a further increase of the maximum pressure in the discharge zone 11 of the compressor. Thus, the pressure-limiting valve 50 according to the invention not only limits the pressure by allowing pressurized medium to escape from the high-pressure zone 11, but also serves to control the length of the piston stroke as the medium escaping from the high-pressure zone is directed into the piston-drive compartment 16 where it raises the pressure level in the piston-drive pressure zone. Known compressors also have a further connection from the piston-drive compartment to the suction side of the compressor to regulate the pressure in the piston-drive compartment to a lower level if needed. The piston drive compartment can have a pressure-relief connection to the suction compartment either through a throttle with a fixed setting or through a variably adjustable valve. The last-mentioned valve could additionally serve, e.g., to control the piston stroke of the compressor in operating modes other than an overpressure condition, and the pressure-limiting valve 50 could in this case work as an additional measure that is activated when the pressure in the high-pressure zone reaches the maximum allowable level.

In a further embodiment of the pressure-limiting valve according to the invention, the valve piston 6 is subjected not only to the spring force but also to an additional force that is generated by a remote-controllable actuating device such as, e.g., an electromagnet whose magnetic force pushes the valve piston into the closed position, or an electrical actuating motor device, or a pressure-actuated cylinder that changes the closing force on the valve piston 6 hydraulically or pneumatically, or also a temperature-dependent actuating element. Using one or more of the aforementioned devices, the limit for the maximally allowable pressure in the compressor can be set by remote control and can be adapted to the prevailing operating conditions in accordance with a regulation/control program for the entire air-conditioning system. In any case, the advantageous concept of the invention provides that the limit for the maximally allowable pressure is not exceeded, that the limit is set reliably through the counterbalancing comparison against a combination of the ambient pressure, the spring force and the remote-controllable additional force, and that when the pressure-limitation becomes activated, the stream of pressure medium that causes the pressure to let up or to stay under the limit is used to perform the additional function of reducing the tilt angle of the swash plate or wobble plate and thereby reducing the throughput power of the compressor.

The pressure-limiting valve device according to the invention provides a compressor with the capability to limit its own power level by reducing the tilt angle if the pressure rises to the maximally allowable limit and thereby to avoid a loss or waste of energy that would occur without the inventive device in situations where the compressor reaches the maximally allowable pressure.

In a further embodiment, the safety valve can also be designed with a constant amount of leakage from the high-pressure zone 11 to the piston-drive chamber 16. The leakage stream can be taken through a gap or play between the piston 6 and the piston-guiding surface in the valve housing 5, or it can be conducted through a separately arranged throttle bore, e.g., through the bore channel 18 shown in FIG. 1. In this case, there is no need for a separate fixed throttle passage in the compressor housing between the high-pressure zone and the piston-drive zone, and a constant circulation of lubricant oil from the high-pressure zone to the piston-drive zone is assured, as the lubricant oil for the compressor is contained as an additive in the refrigerant medium of the air-conditioning system. With the separate throttle bore channel, it is also possible to configure the pressure-limiting valve 50 as a leakage-free seat valve.

If an additional remote-controllable force is used to raise or lower the pressure threshold at which the valve 50 begins to open, it is possible to use the compressor in a working mode where the discharge pressure is in the same range as the threshold pressure, so that the valve according to the invention can be used to regulate the tilt angle and thus the amount of piston displacement. To apply this concept in practice, it is necessary to additionally provide the compressor with a switching- or regulating valve or a fixed throttle between the piston-drive chamber and the suction-pressure zone.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A safety device to limit the pressure in a compressor housing, said compressor housing comprising a discharge pressure zone in which a high pressure is generated and an intake pressure zone in which a suction pressure is generated, said compressor housing further comprising:

a piston-drive chamber being part of a piston-drive pressure zone, a first pressure differential existing between the discharge pressure zone and the piston-drive pressure zone and a second pressure differential existing between the piston-drive pressure zone and the intake pressure zone;

a connector channel from the discharge pressure zone to the piston-drive pressure zone; wherein:

said safety device comprises a valve device arranged in the connector channel;

said valve device, in response to said high pressure exceeding a given maximally allowable discharge pressure, allows an increased flow of a pressure medium from the discharge pressure zone to the piston-drive pressure zone;

said valve device comprises a movable valve body for closing and opening the valve device, wherein said movable valve body is pushed in an opening direction of the valve device by said high pressure acting against at least a biasing force of a spring; and the valve device comprises a spring compartment adjoining said movable valve body and containing said spring, the movable valve body has a surface area inside the spring compartment, the spring compartment shares an ambient atmospheric pressure, and said ambient atmospheric pressure acts against said surface area.

2. The safety device of claim 1, wherein the compressor housing further comprises a bypass throttle from the discharge pressure zone to the piston-drive pressure zone.

3. The safety device of claim 1, wherein the valve device comprises a pressure-limiting valve.

4. The safety device of claim 1, wherein the valve device comprises a cover plate, a bellows, said spring, a housing part of the compressor housing, a valve housing, a first sealing device arranged between said cover plate and said housing part, a second sealing device and a third sealing device both arranged between said housing part and said valve housing, and wherein the movable valve body comprises a valve piston.

5. The safety device of claim 4, wherein at least one of said first, second and third sealing devices comprises an O-ring seal.

6. The safety device of claim 1, wherein the given maximally allowable discharge pressure is adjustable.

7. A safety device to limit the pressure in a compressor housing, said compressor housing comprising a discharge pressure zone in which a high pressure is generated, said compressor housing further comprising:

a piston-drive chamber being part of a piston-drive pressure zone, a pressure differential existing between the discharge pressure zone and the piston-drive pressure zone;

a connector channel from the discharge pressure zone to the piston-drive pressure zone; wherein:

said safety device comprises a valve device arranged in the connector channel;

said valve device, in response to said high pressure exceeding a given maximally allowable discharge pressure, allows an increased flow of a pressure medium from the discharge pressure zone to the piston-drive pressure zone;

said valve device comprises a movable valve body for closing and opening the valve device, wherein said movable valve body is pushed in an opening direction of the valve device by said high pressure acting against at least a biasing force of a spring; and the valve device comprises a spring compartment adjoining said movable valve body and containing said spring, the movable valve body has a surface area inside the spring compartment, the spring compartment shares an ambient atmospheric pressure, and said ambient atmospheric pressure acts against said surface area.

8. The safety device of claim 7, wherein the compressor housing further comprises a bypass throttle from the discharge pressure zone to the piston-drive pressure zone.

9. The safety device of claim 7, wherein the valve device comprises a pressure-limiting valve.

10. The safety device of claim 7, wherein the valve device comprises a cover plate, a bellows, said spring, a valve housing, a housing part of the compressor housing, a first sealing device arranged between said cover plate and said housing part, a second sealing device and a third sealing device both arranged between said housing part and said valve housing, and wherein the movable valve body comprises a valve piston.

11. The safety device of claim 10, wherein at least one of said first, second and third sealing devices comprises an O-ring seal.

12. The safety device of claim 7, wherein the given maximally allowable discharge pressure is adjustable.

* * * * *